United States Patent
Druskin et al.

[11] Patent Number: 6,115,670
[45] Date of Patent: Sep. 5, 2000

[54] METHOD, APPARATUS, AND ARTICLE OF MANUFACTURE FOR SOLVING 3D MAXWELL EQUATIONS IN INDUCTIVE LOGGING APPLICATIONS

[75] Inventors: Vladimir L'vovich Druskin, Ridgefield; Ping Lee, Stamford, both of Conn.; Leonid Aronovich Knizhnerman, Moscow, Russian Federation

[73] Assignee: Schlumberger Technology Corporation, Ridgefield, Conn.

[21] Appl. No.: 08/984,749

[22] Filed: Dec. 4, 1997

Related U.S. Application Data

[60] Provisional application No. 60/032,095, Dec. 4, 1996.

[51] Int. Cl.$^7$ ..................................................... G06F 19/00
[52] U.S. Cl. ............................................................. 702/7
[58] Field of Search ................................................... 702/7

[56] References Cited

U.S. PATENT DOCUMENTS

| | | | |
|---|---|---|---|
| 5,041,975 | 8/1991 | Minerbo et al. | 364/422 |
| 5,157,605 | 10/1992 | Chandler et al. | 364/422 |
| 5,210,691 | 5/1993 | Freedman et al. | 702/7 |
| 5,355,088 | 10/1994 | Howard, Jr. | 324/339 |

OTHER PUBLICATIONS

B. Anderson et al., "New Dimensions in Modeling Resistivity", *Schlumberger Oilfield Review*, vol. 9, No. 1, pp. 41–56 (Spring, 1997).

Alumbaugh D., and Newman G., "Time Efficient 3–D Electromagnetic Modeling on Massively Parallel Computers", *Proc. of Int. Symp. on Three–Dimensional Electromagnetics*, Oct. 1995, Schlumberger–Doll Research, Ridgefield.

Anderson et al., "The Response of Multiarray Induction Tools in Highly Dipping Formations with Invasion and in Arbitrary 3–D Geometry", *SPWLA Annual Conf.*, New Orleans, LA, Jun. 1996.

Boyse, W. et al., "Nodal Based Finite Element Modeling of Maxwell's Equations", *IEEE Trans. Antennas Propagation*, 40 (1992) No. 6, pp. 642–651.

Druskin et al., "A Spectral Semi–Discrete Method for the Numerical Solution of 3–D Non–Stationary Problems in Electrical Prospecting", *Izv. Acad. Sci. USSR, Phys. Solid Earth*, 1988, No. 8, 63–74 (Russian; translated into English).

Druskin et al., "Spectral Approach to Solving Three–Dimensional Maxwell's Diffusion Equations in the Time and Frequency Domains", *Radio Science*, vol. 29, No. 4, pp. 937–953, 1994.

Madden, T. R. et al., "Three–Dimensional Magnetotelluric Modeling and Inversion", *Proc. IEEE*, 77, pp. 319–323 (1989).

M. van der Horst et al., "Modeling the Response of Induction Logging Tools in 3D Geometries with the Spectral Lanczos Decomposition Method" *Int'l Symposium on Three–Dimensional Electromagnetics*, Oct. 4–6, Schlumberger–Doll Research, 1995, pp. 491–498.

Druskin et al., "Solution of Maxwell Equations Using Krylov Subspace from Inverse Powers of Stiffness Matrix".

*Primary Examiner*—Donald E. McElheny, Jr.
*Attorney, Agent, or Firm*—William B. Batzer; David Garrod

[57] ABSTRACT

The present invention involves a method for modeling the response of an electromagnetic tool to a subsurface formation including: (i) formulating a set of frequency-domain Maxwell equations, including a Maxwell operator, using a three-dimensional representation of the subsurface formation; (ii) generating a Krylov subspace from inverse powers of the Maxwell operator by computing actions of an inverse of the Maxwell operator; and (iii) repeating (ii) as needed to achieve convergence of a frequency-domain solution that characterizes the modeled response of the electromagnetic tool to the subsurface formation. The invention further involves a related apparatus for modeling the response of an electromagnetic tool to a subsurface formation and a related article of manufacture having a computer program that causes a computer to perform the inventive method.

20 Claims, 8 Drawing Sheets

METHOD, APPARATUS, AND ARTICLE OF MANUFACTURE FOR SOLVING 3D MAXWELL EQUATIONS IN INDUCTIVE LOGGING APPLICATIONS

CROSS-REFERENCE TO RELATED APPLICATION

This application derives from U.S. Provisional Patent Application Ser. No. 60/032,095, filed Dec. 4, 1996, and incorporated herein by reference.

FIELD OF THE INVENTION

The present invention relates generally to well logging and geological prospecting. More specifically, the invention relates to the modeling of induction logging tool responses in complex, 3D geometries, such as those encountered in deviated and horizontal wells.

BACKGROUND OF THE INVENTION

Use of induction logging tools is well-known in the well logging field. (See, e.g., U.S. Pat. Nos. 5,157,605 and 5,041,975, both incorporated herein by reference, and the references cited therein.)

Generally speaking, in "induction logging," one or more transmitter coil(s), energized by alternating current(s), is/are disposed in a borehole (either on a wireline or as part of a logging-while-drilling apparatus) and indication are obtained of the influence of surrounding formations on the electromagnetic field established by the coil(s). Usually, such indications are obtained by observing the voltage(s) induced in one or more receiver coil(s) disposed in the borehole in a coaxial relationship with the transmitter coil(s).

In order to interpret the responses obtained from an induction logging tool (or, for the matter, any sort of downhole tool), it is necessary to understand how the "responds" to various subsurface formations. This mapping between subsurface formation features and tool response is referred to as a "model," and the process of creating a "model" is referred to as "modeling." For an induction logging tool, the critical subsurface parameter is resistivity. Thus, in induction logging, "modeling" involves determining the tools response to a given resistivity distribution in the region of the tool. Such modeling is often referred to as "resistivity modeling."

In the case of purely vertical wells, one can make assumptions about the formations resistivity distribution (e.g., that it is symmetric about the axis of the well) which greatly reduce the complexity of computing the tool response. Unfortunately, such assumptions break down in the increasingly-common realm of deviated and horizontal wells. Such wells demand full, 3D solutions. And, even using the best available techniques and hardware, solving the general, 3D problem is very costly. See B. Anderson et al., "New Dimensions in Modeling Resistivity," Schlumberger Oilfield Review, vol. 9, no. 1, pp. 41–56 (Spring, 1997). Among persons skilled in the art, the need for improved methods of resistivity and tool response modeling is well known.

Accordingly, one object of the invention relates to an improved method, apparatus, and article of manufacture for modeling the response of induction logging and other electromagnetic tools to subsurface formations.

Another object of the invention involves an improved method, apparatus, and article of manufacture for modeling the response of induction logging and other electromagnetic tools using a Spectral Lanczos Decomposition ("SLDM") method.

Yet another object of the invention concerns an improved method, apparatus, and article of manufacture for modeling the response of induction logging and other electromagnetic tools using an SLDM method, with Krylov subspaces generated from the inverse powers of the Maxwell operator.

Still another object of the invention relates to an improved method, apparatus, and article of manufacture for modeling the response of induction logging and other electromagnetic tools using an improved SLDM method, in which convergence is independent of conductivity contrast or frequency.

A still further object of the invention involves interpretation of subsurface formations using modeling data supplied by the aforementioned methods, apparatus, and articles of manufacture.

SUMMARY OF THE INVENTION

Generally speaking, and without intending to be limiting, one aspect of the invention relates to computer-implemented methods of creating subsurface models, including, for example, the following: (i) formulating a set of frequency-domain Maxwell equations, including a Maxwell operator; (ii) generating a Krylov subspace from inverse powers of the Maxwell operator by computing actions of an inverse of the Maxwell operator; and, (iii) repeating (ii) as needed to achieve convergence of a frequency-domain solution.

Again, generally speaking, and without intending to be limiting, another aspect of the invention relates to a computer-based apparatus for managing geological hypotheses, including, for example, a system containing the following components: (i) means (of any type whatsoever) for formulating a set of frequency-domain Maxwell equations, including a Maxwell operator; (ii) means (of any type) for generating a Krylov subspace from inverse powers of the Maxwell operator by computing actions of an inverse of the Maxwell operator; and, (iii) means (of any type) for repeating (ii) as needed to achieve convergence of a frequency-domain solution.

Again, generally speaking, and without intending to be limiting, another aspect of the invention relates to an article of manufacture for use in connection with a computer, such as, for example, an article of manufacture comprising a computer-readable storage medium having a program embodied therein which causes the computer to: (i) formulate a set of frequency-domain Maxwell equations, including a Maxwell operator; (ii) generate a Krylov subspace from inverse powers of the Maxwell operator by computing actions of an inverse of the Maxwell operator; and, (iii) repeat (ii) as needed to achieve convergence of a frequency-domain solution.

BRIEF DESCRIPTION OF THE DRAWINGS

The present invention will now be described by way of example with reference to the accompanying drawings, in which.

DETAILED DESCRIPTION OF THE PREFERRED EMBODIMENT

Figure 1:
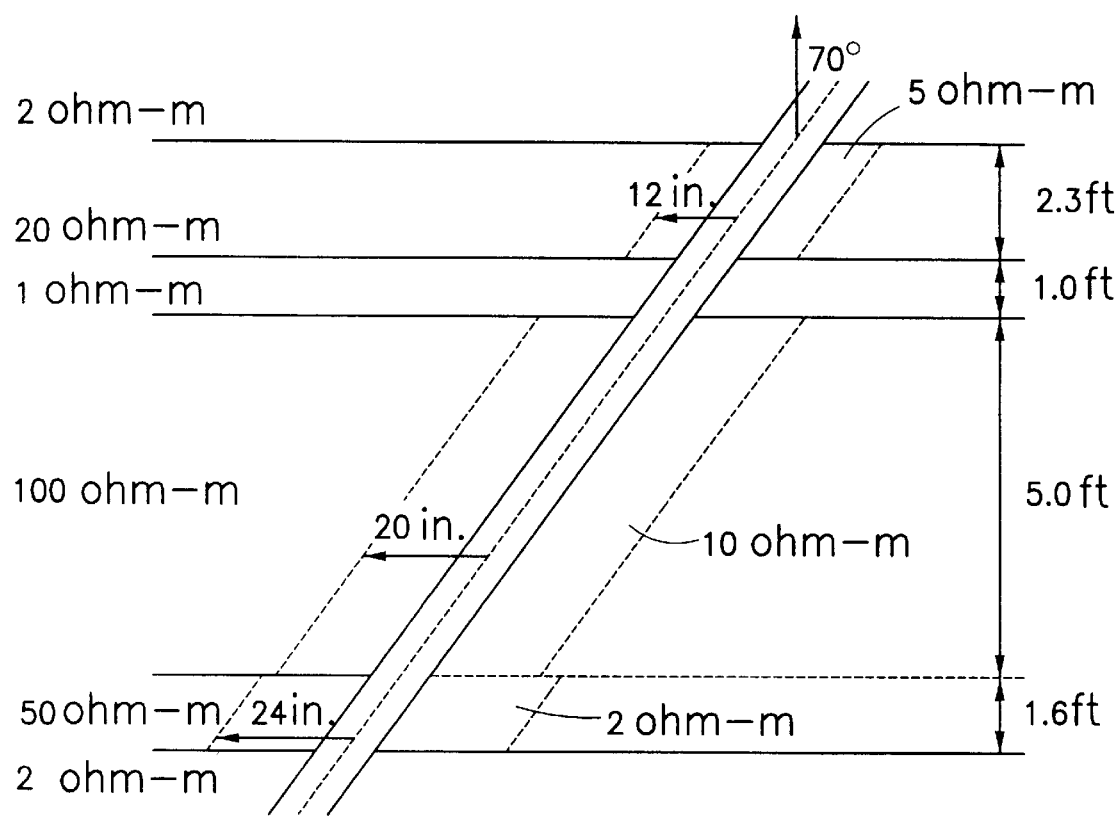
FIG. 1 one depicts a six-layer model of a deviated borehole.

One exciting area where Krylov subspace techniques have enjoyed much success is in obtaining solution to three dimensional Maxwell equations for the applications in geophysical prospecting. Traditional Krylov subspace techniques such as the Conjugate Gradient Method (CG), Biconjugate Gradient Method (BCG), and Quasiminimal Residual Methods (QMR) are well known in the geophysical literature [3, 7, 1, 8]. It has been well documented that, in obtaining numerical solution to Maxwell equations using those methods, special care must be taken to prevent generation of spurious modes caused by the numerical inaccuracy in approximating divergence-free functions. Complications also arise in handling complex non-Hermitian matrices and multiple frequencies, in order to convert to the time-domain problem.

The spectral Lanczos decomposition (SLDM) method, which first appeared in geophysical literature in [4] (see also [2, 5]), is also based on a Krylov subspace technique for solution of Maxwell equation. It has the capability to completely remove numerical spurious modes. It also can, when implemented for computer simulations, compute solutions for multiple frequencies at the cost of a single frequency. In addition, the main computation deals only with real symmetric matrices, and can be easily transformed to the time-domain solution, where it exhibits unconditional stability and exponential convergence. However, as shown in [5], the convergence of SLDM depends on the conductivity contrast and frequency; in particular, the convergence slows down for high contrast and/or low frequencies. Moreover, for low frequency problems, the finite difference grid (with large aspect ratios) used in discretization introduces ill-conditioning to the stiffness operator. Like all other Krylov subspace-based methods, it is difficult to come up with good preconditioners for SLDM.

The invention provides an alternative approach for solution of Maxwell equations. The new method is based on the SLDM (which we will refer to as the standard SLDM) but with Krylov subspaces generated from the inverse powers of the Maxwell operator (which we will refer to as SLDMINV. This new approach is particularly effective in lower frequency ranges. SLDMINV has a significantly faster convergence rate than that of standard SLDM and, at the same time, retains the advantages of standard SLDM, such as the capability of solving for multiple frequencies in a single simulation run, matrix operations in real arithmetic, and the ability to eliminate numerical spurious modes. The efficiency of the new algorithm relies on fast evaluation of the inverse powers of the stiffness operator. The inverse operator is computed from a decomposition of curl-free and divergence-free projections. The solutions of these projections are computed by discrete Fourier transforms (DFT) and preconditioned conjugate gradient (PCG) iterations. We show that the convergence rate of the new method improves as frequency decreases, which makes it more attractive for low frequency applications. The new solution technique is applied to model induction logging in geophysical prospecting applications, giving rise to close to two orders of magnitude convergence improvement over the standard Krylov subspace approach. This makes it feasible to routinely use 3D modeling for model-based interpretation [2], a breakthrough in induction logging and interpretation.

The remainder of this disclosure is organized as follows: It begins with a brief description of Maxwell equations and boundary conditions. Next, the standard spectral Lanczos decomposition method (SLDM) is introduced. It then presents some motivation for the use of Krylov subspaces generated from inverse of the stiffness operator. Next, it describes an efficient way of computing the action of the inverse operator. And, in the final section, numerical results and performance speed-up are presented, which clearly demonstrate the superiority of the invention over the best prior-art approach.

Maxwell Equations

We consider the frequency domain problem for Maxwell's equations, $$\nabla \times E + i\omega\mu H = 0 \quad \nabla \times H - \sigma E = J. \qquad (1)$$

The symbols $\sigma = \sigma(x,y,z)$ and $\mu$ denote the conductivity coefficient and the permeability constant, respectively. Displacement current is assumed to be negligible. Substitutions of equation (1) lead to the equation expressed in terms of electric field E, $$\sigma^{-1}\mu^{-1}\nabla \times \nabla \times E + i\omega E = i\omega\sigma^{-1}J \qquad (2)$$

We define operator $$A = \sigma^{-1}\mu^{-1}\nabla \times \nabla \times \qquad (3)$$

and source function $$\phi = \sigma^{-1}J$$

Then (2) becomes $$(A + i\omega I)E = i\omega\phi, \qquad (4)$$

For convenience, we assume the domain of interest $\Omega = \{(x,y,z): x_{min} \leq x \leq x_{max}, y_{min} \leq y \leq y_{max}, z_{min} \leq z \leq z_{max}\}$. The boundary condition of equation (2) (or (4)) is given by $$E \times n|_{\partial\Omega} = 0. \qquad (5)$$

Note that the Gauss Theorem implies the right hand side of equation (4) is orthogonal to the null-space of A, thus the boundary value problem (4) and (5) is well-posed. Here, we assume that the equation (2) is discretized by finite difference method on a staggered Yee grid and a resulting a matrix equation of form (4), which we will use interchangeably, i.e. We will use A to denote both the continuous operator defined in (3) and its discrete counterpart when there is no ambiguity.

Spectral Lanczos Decomposition Method

The present invention is based on the SLDM—Spectral Lanczos Decomposition Method. SLDM was first introduced by Druskin and Knizhnerman[4] for the solution of parabolic Maxwell equations in both time and frequency domain. The method can be extended to more general second order partial differential equations [5].

The motivation of spectral decomposition for matrix function evaluation can be stated as follows. Let A be a matrix with eigenvalue and eigenvector pairs $(\lambda_i, z_i)$, $i=1, \ldots, n$. To evaluate the matrix function $f(A)$, i.e., $$u = f(A)\varphi, \qquad (6)$$

and if we can write $$\varphi = \sum_{i=1}^{n} \varphi_i z_i,$$

then formally the matrix function evaluation can be carried out by $$u = \sum_{i=1}^{n} \varphi_i f(\lambda_i) z_i. \qquad (7)$$

In practice, direct computation of a complete set of eigenvalues and eigenvectors of matrix A can be prohibitively expensive. The Lanczos method provides an efficient means for approximating the spectrum of A. From Krylov subspaces $$K^m(A,\varphi) = \text{span}\{\varphi, A\varphi, \ldots, A^{m-1}\varphi\},$$

Gram-Schmidt orthogonalization produces an orthonormal basis $\{q_1, q_2, \ldots, q_m\}$ by Lanczos process $$Aq_i = \beta_{i-1} q_{i-1} + \alpha_i q_i + \beta_i q_{i+1}$$

So that $$K^m(A,\varphi) = \text{span}\{q_1, q_2, \ldots, q_m\}$$

We denote $$H = \begin{pmatrix} \alpha_1 & \beta_1 & & & \\ \beta_1 & \alpha_2 & \beta_2 & & \\ & & \ddots & & \\ & & \beta_{m-2} & \alpha_{m-1} & \beta_{m-1} \\ & & & \beta_{m-1} & \alpha_m \end{pmatrix}$$

and $$Q = (q_1, q_2, \ldots, q_m)$$

Then $$AQ = QH$$

Let $\theta_i$, $s_i$ be the eigenvalue and normalized eigenvectors of H. $e_1 = (1, 0, \ldots, 0)^T$, $y_i = Qs_i$. Then $$\varphi = \|\varphi\| q_1 = \|\varphi\| Q e_1$$

$$= \|\varphi\| Q \sum_{i=1}^{m} s_{1,i} s_i = \|\varphi\| \sum_{i=1}^{m} s_{1,i} y_i$$

Formally, $$f(A)\varphi = \|\varphi\| f(A) q_1$$

$$= \|\varphi\| f(A) Q e_1$$

$$= \|\varphi\| Q \sum_{i=1}^{m} s_{1,i} f(\theta_i) s_i$$

$$= \|\varphi\| Q f(H) e_1$$

We can define $$u_m = \|\varphi\| Q \sum_{i=1}^{m} s_{1,i} f(\theta_i) s_i = \|\varphi\| Q f(H) e_1 \qquad (8)$$

REMARK: One advantage of using spectral decomposition method for solving the Maxwell equation (2) is that one can pick and choose in the computed spectrum so that one can easily eliminate spurious modes generated by the numerical approximation of the operator defined in (3). The stability problem caused by numerical spurious mode has been well documented and is important in obtaining accurate solutions to the Maxwell equations at low frequency.

Using Krylov Subspaces from $A^{-1}$

In view of (7), the matrix function $(A+i\omega I)^{-1}$ can be formally written as $$(A + i\omega I)^{-1} = \sum_{k=0}^{\infty} (-1)^k (i\omega)^{-(k+1)} A^k \qquad (9)$$

Persons skilled in the art will appreciate that the convergence of the truncated series depends on the value of $\omega$. In particular, the convergence rate is slower when frequency $\omega$ is smaller. We can rewrite $(A+i\omega I)^{-1}$ as $$(A+i\omega I)^{-1} = -i\omega^{-1}(A^{-1} - i\omega^{-1} I)^{-1} A^{-1}$$

Again, we can write formally $$(A^{-1} - i\omega^{-1} I)^{-1} = \sum_{k=0}^{\infty} (-1)^k (i\omega)^{k+1} A^{-k} \qquad (10)$$

Comparing (9) with (10), we see that the truncated series in (10) should converge faster than that of (9) when the frequency $\omega$ is small. This suggests that faster convergence rate can be obtained for small $\omega$ if we use SLDM with the Krylov subspace $K^m(A^{-1}, \varphi) = \text{span}\{\varphi, A^{-1}\varphi, \ldots, A^{-(m-1)}\varphi\}$. The solution of (4) can be written as $$E = -i\omega^{-1}(A^{-1} - i\omega^{-1} I)^{-1} A^{-1} \varphi. \qquad (11)$$

Calculation of $A^{-1}$

Computing the Krylov subspaces $K^m(A^{-1}, \varphi)$, originated from the operator $A^{-1}$ requires computing the action of $A^{-1}$ at each Lanczos step. More precisely, if $\psi$ is the last Lanczos vector, then we need to compute $\epsilon = A^{-1} \psi$. Recalling the definition of A in (3), this translates to solving the equation $$\nabla \times \nabla \times \epsilon = \sigma \mu \psi, \qquad (12)$$

subject to boundary condition $$\epsilon \times n = 0. \qquad (13)$$

By Gausss Theorem, we assume all Lanczos vectors $\epsilon$ satisfy $$\nabla \cdot \sigma \epsilon = \nabla \cdot \sigma \varphi = 0, \qquad (14)$$

where $\phi$ is the first Lanczos vector. We can then decompose $\epsilon$ into $\epsilon = \epsilon_0 + \nabla \Phi$, such that $\nabla \cdot \epsilon_0 = 0$. Since $\nabla \Phi$ is curl-free, we have $$\nabla \times \nabla \times \epsilon_0 = \mu \phi \psi.$$

Using the vector identity $\nabla \times \nabla \times = -\Delta + \Delta \Delta \cdot$ and the divergent free condition of $\epsilon_0$, we arrive at $$-\Delta \epsilon_0 = \mu \phi \psi. \tag{15}$$

The divergence free condition (14) gives rise to $$-\nabla \cdot \phi \nabla \Phi = \nabla \cdot \phi \epsilon_0, \tag{16}$$

From the above derivation, those skilled in the art will appreciate that the evaluation of $A^{-1} \psi$ can be reduced to the solution of the vector Laplace equation (15) and the DC equation (16), with appropriate boundary conditions. The boundary condition (13) suggests that we can choose homogeneous Dirichlet boundary condition for the DC equation, i.e., $$\Phi|_{\partial \Omega} = 0, \tag{17}$$

and $$\epsilon_0 \times n|_{\partial \Omega} = 0. \tag{18}$$

The divergence condition $\nabla \cdot \epsilon_0 = 0$ suggests the following complimentary normal flux boundary condition $$\left( \frac{\partial (\xi_0 \cdot n)}{\partial n} \right)\bigg|_{\partial \Omega} = 0. \tag{19}$$

For finite difference approximations of the vector Poisson equation (15) on the domain $\Omega = \{(x,y,z): x_{min} \leq x \leq x_{max}, y_{min} \leq y \leq y_{max}, z_{min} \leq z \leq z_{max}\}$. The x-component of the equation (15) is $$-\Delta \epsilon_0^x = \mu \sigma \psi^x, \tag{20}$$

with boundary conditions $$\epsilon_0^x|_{y=y_{min}} = \epsilon_0^x|_{y=y_{max}} = 0, \epsilon_0^x|_{z=z_{min}} = \epsilon_0^x|_{z=z_{max}} = 0, \tag{21}$$

and $$\frac{\partial \xi_0^x}{\partial x}\bigg|_{x=x_{min}} = \frac{\partial \xi_0^x}{\partial x}\bigg|_{x=x_{max}} = 0. \tag{22}$$

The equations and boundary conditions for $\epsilon_0^y$ and $\epsilon_0^z$ are defined in a similar fashion.

REMARK I: The key to the computational efficiency of our new solution scheme relies on whether we can efficiently evaluate the action of $A^{-1}$ described in this section. To compute the action of $A^{-1}$ we need to solve four scalar equations (three scalar Poisson equations and a DC equation). The solution to the finite difference equations for the boundary value problem (20), (21), and (22) can be obtained efficiently by either FFT or DFT. Similarly, for the solution of $\epsilon_0^y$ and $\epsilon_0^y$. The solution to the DC equation can be obtained by preconditioned conjugate gradient iterations. The effectiveness of the preconditioner depends on the characteristics of the underlying finite difference discretization. In our numerical experiments for induction logging simulations, preconditioning using the incomplete Cliolesky factorization has proven to be very effective.

REMARK II: Strictly speaking, the equations (15) and (16) are uncoupled only if the domain of interest is the whole space. The coupling in bounded domains are enforced by boundary conditions.

Numerical Examples

We have implemented the algorithm outlined in the previous sections for the solution of Maxwell equations to model induction logging in geophysical applications, which typically have operating frequency in the kHz range. The equations (4) are discretized by finite difference approximation on a Yee grid [9]. The whole space is approximated by truncating the space into a large rectangular box. To further reduce the number of grid points in the numerical approximation, the box is subdivided by a variable size finite difference grid (exponentially increasing from the center of the box). This is made possible by the diminishing variation of the electromagnetic field away from the center of the box, where sources and receivers are located. The invention is preferably used in conjunction with a 3D geometric modeler, which allows users to construct arbitrary 3D formation models. The finite difference grids need not necessarily conform to the formation geometry. The underlying effective medium is calculated by material averaging. As shown in the following numerical examples, our material averaging produces accurate approximations to arbitrary formation models.

Figure 2:
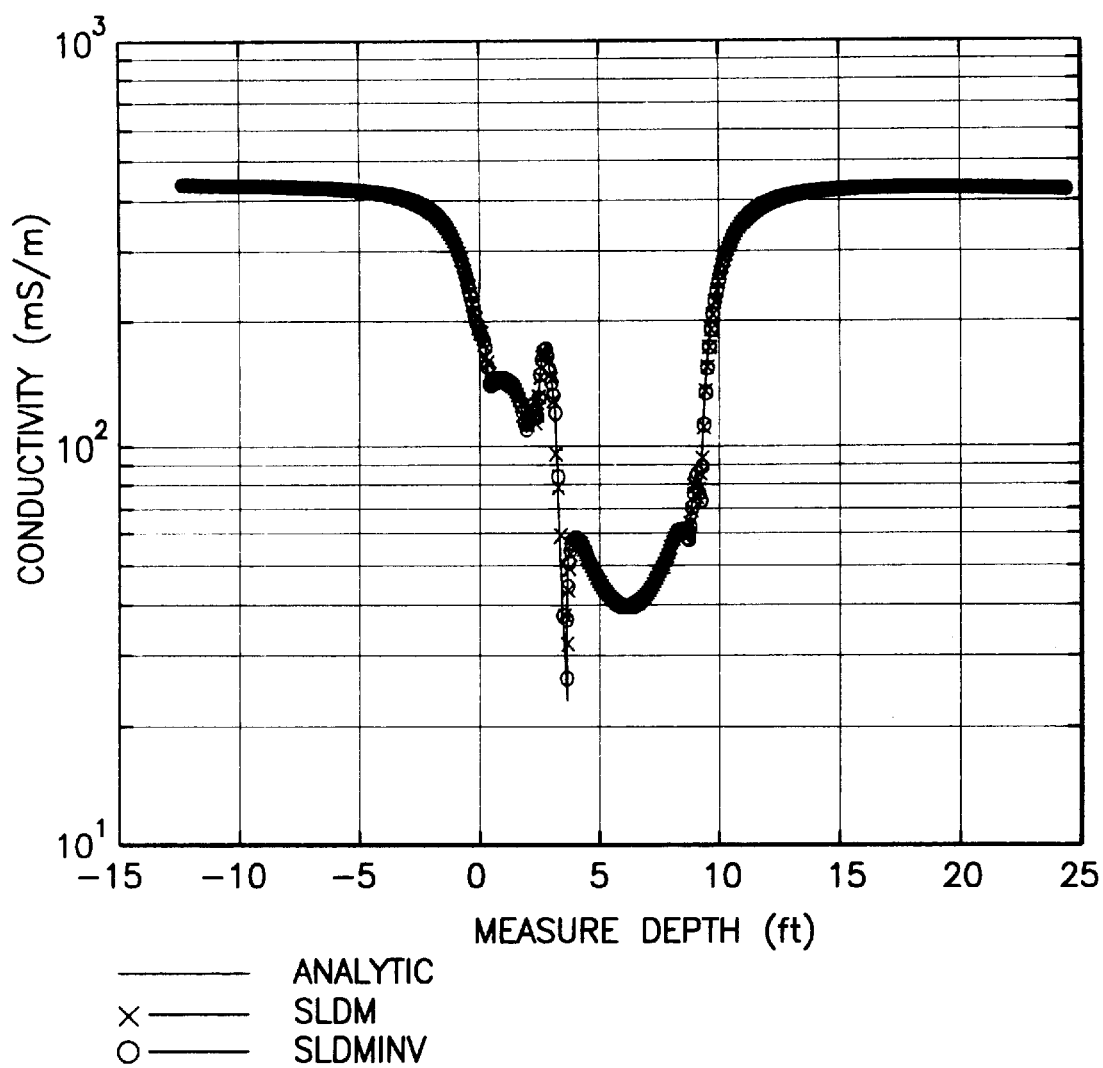
FIG. 2 shows the comparison of results of SLDM and SLDMINV with analytical results, in absence of invasions.
Figure 3:
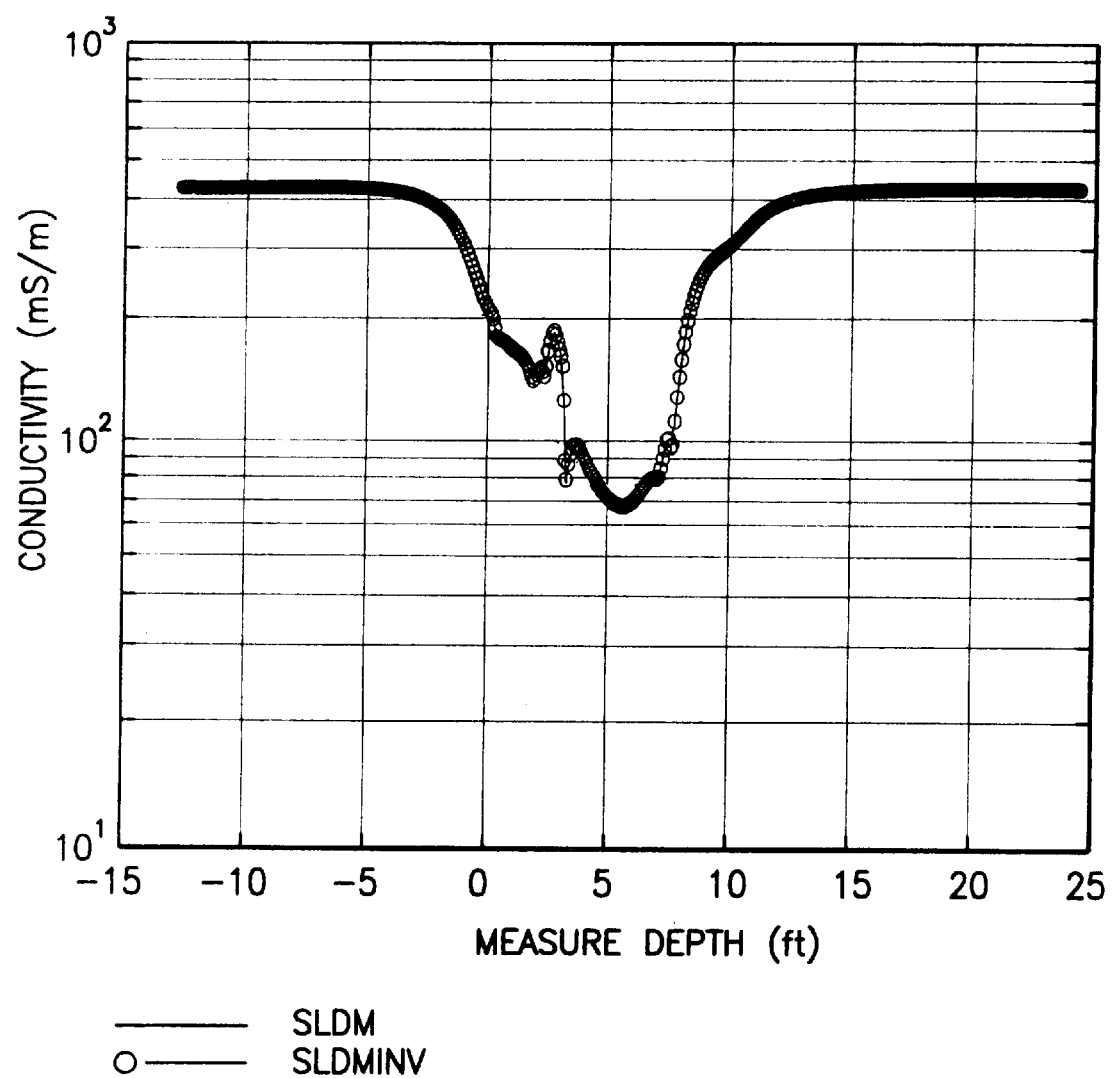
FIG. 3 shows a comparison of results of SLDM with that of SLDMINV, in the presence of invasions.

For the sake of demonstration, we will use SLDM to refer to the standard Krylov sub-space approach and SLDMINV to the new approach (i.e., our invention) using the inverse powers. Our numerical experiments were performed to model the response of AIT (Array Induction Tool [Trademark of Schlumberger]), which has three operating frequencies (26 kHz, 52 kHz, and 105 kHz). In FIG. 1 and FIG. 2, we compare the results of SLDM and SLDMINV (with analytical solutions when they exist) for one of the AIT transmitter-receiver pair operating at 52 kHz. Other channels exhibit similar behavior. FIG. 1 shows a six-layer model of a layered medium. The logging trajectory follows the borehole, which is deviated 70 degrees from vertical. There are invasions in the second, forth, and fifth layers. FIG. 2 shows the comparison of results of SLDM and SLDMINV with analytical results, in absence of invasions; FIG. 3 shows a comparison of results of SLDM with that of SLDMINV in the presence of invasions. In both cases, the agreement of SLDM and SLDMINV (and analytical results) is extremely good.

Figure 4:
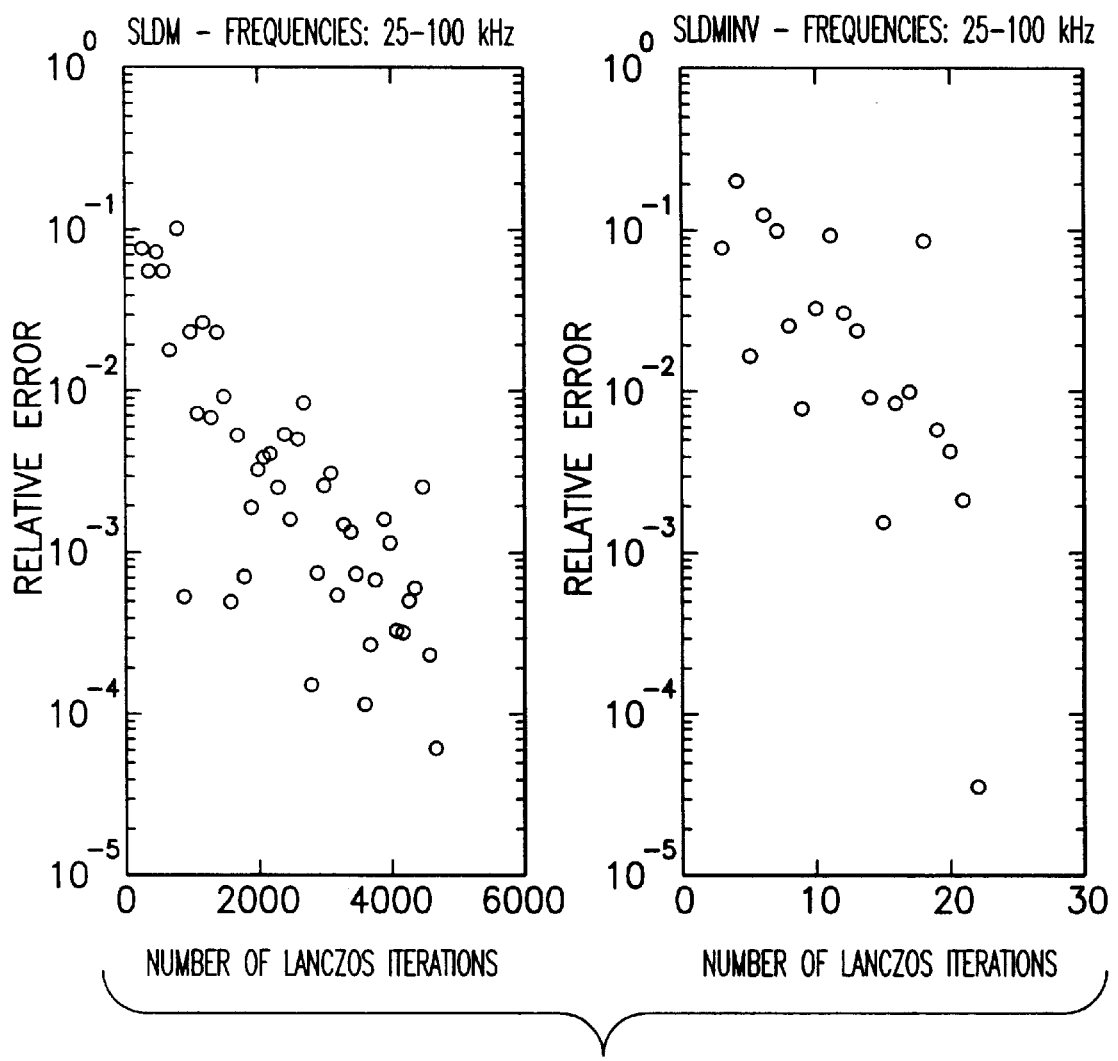
FIG. 4 gives a comparison of convergence of an illustrative case.

Next, we demonstrate the convergence property of SLDMINV. Table 1 compares the convergence rate of SLDM and SLDMINV for all three frequencies, for a typical model. (Recall: convergence depends on the complexity of the model and conductivity contrasts). FIG. 4 gives a comparison of convergence of an illustrative case. Table 2 shows the typical number of iterations required to reduce relative error to $10^{-6}$ as a function of frequency. As is apparent, convergence improves as frequency decreases.

TABLE 1 convergence comparison of SLDM and SLDMINV

|  | # Iteration | Time (min)[1] |
|---|---|---|
| SLDM | 3,000 | 30 |
| SLDMINV | 30 | 0.3 |

TABLE 2 number of iterations to convergence as function of frequency

| Frequency (kHz) | # Iteration |
|---|---|
| 105 | 31 |
| 52 | 23 |
| 26 | 20 |
| 1.0 | 7 |

We have also tested the new method for different levels of conductivity contrast and well deviation. Tables 3 and 4 demonstrate that convergence of SLDMINV is insensitive to conductivity contrast and well deviation.

TABLE 3

SLDMINV Convergence vs. Conductivity Contrast (4 ft. Bed)

| Contrast ($\sigma_B$ = 500 mS) | # Iteration |
|---|---|
| 1 | 31 |
| 10 | 37 |
| 100 | 37 |

TABLE 4

80 degree dip (4 ft. Bed)

| Contrast ($\sigma_B$ 500 mS) | # Iteration |
|---|---|
| 10 | 46 |
| 100 | 36 |

Figure 5:
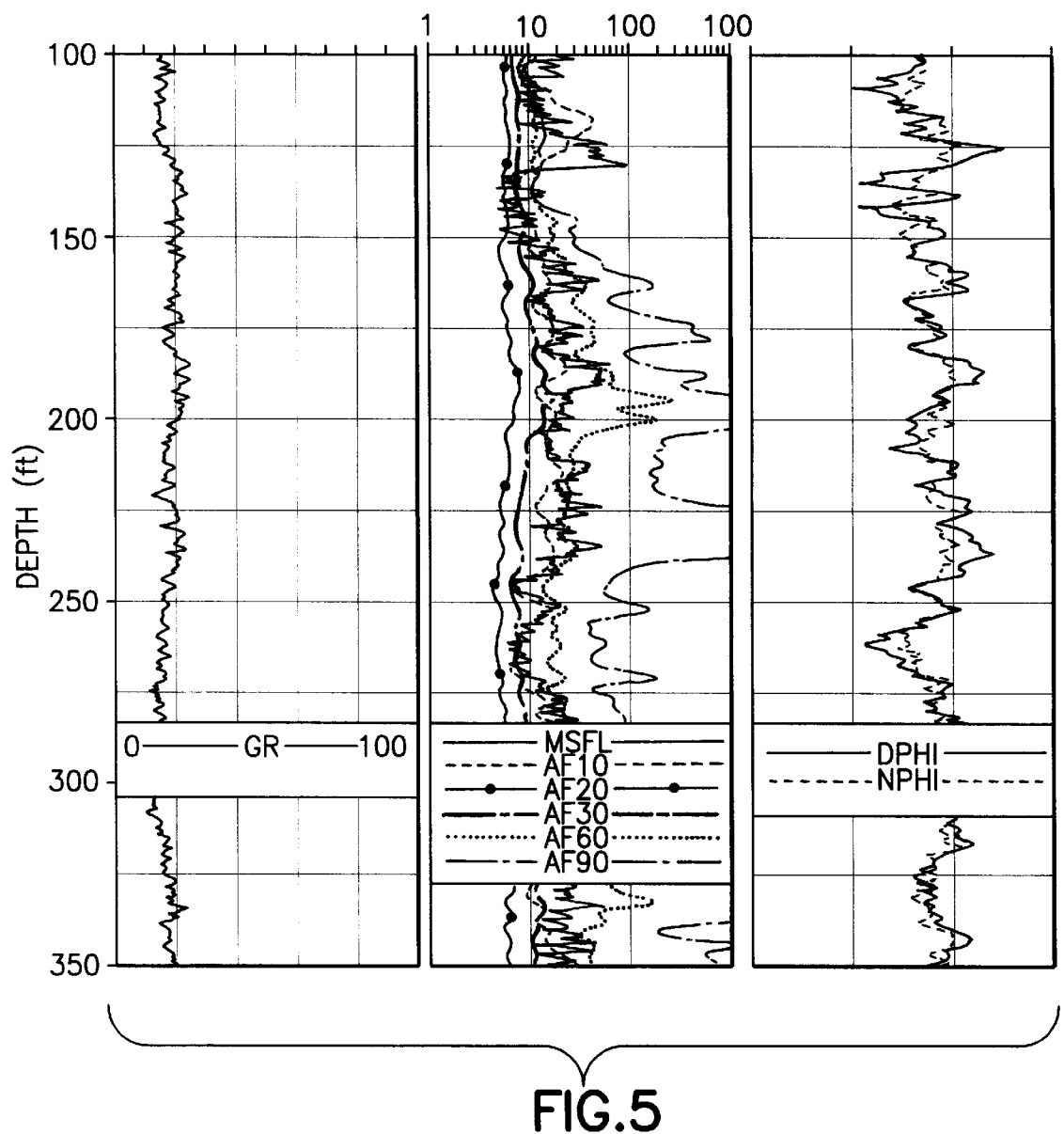
FIG. 5 field log measurements for a horizontal well, just below a shale cap.

To illustrate the power and importance of 3D modeling in interpreting induction logs in horizontal well environment, we give a field log example. This example is a horizontal well from the Middle East, with moderately salty mud invasion. FIG. 5 shows the field logs from a section of the well. The AIT logs are shown in the center track, along with the MSFL (Trademark of Schlumberger) log. Porosity logs are shown in the right track, and the gamma ray log is in the left track.

Figure 6:
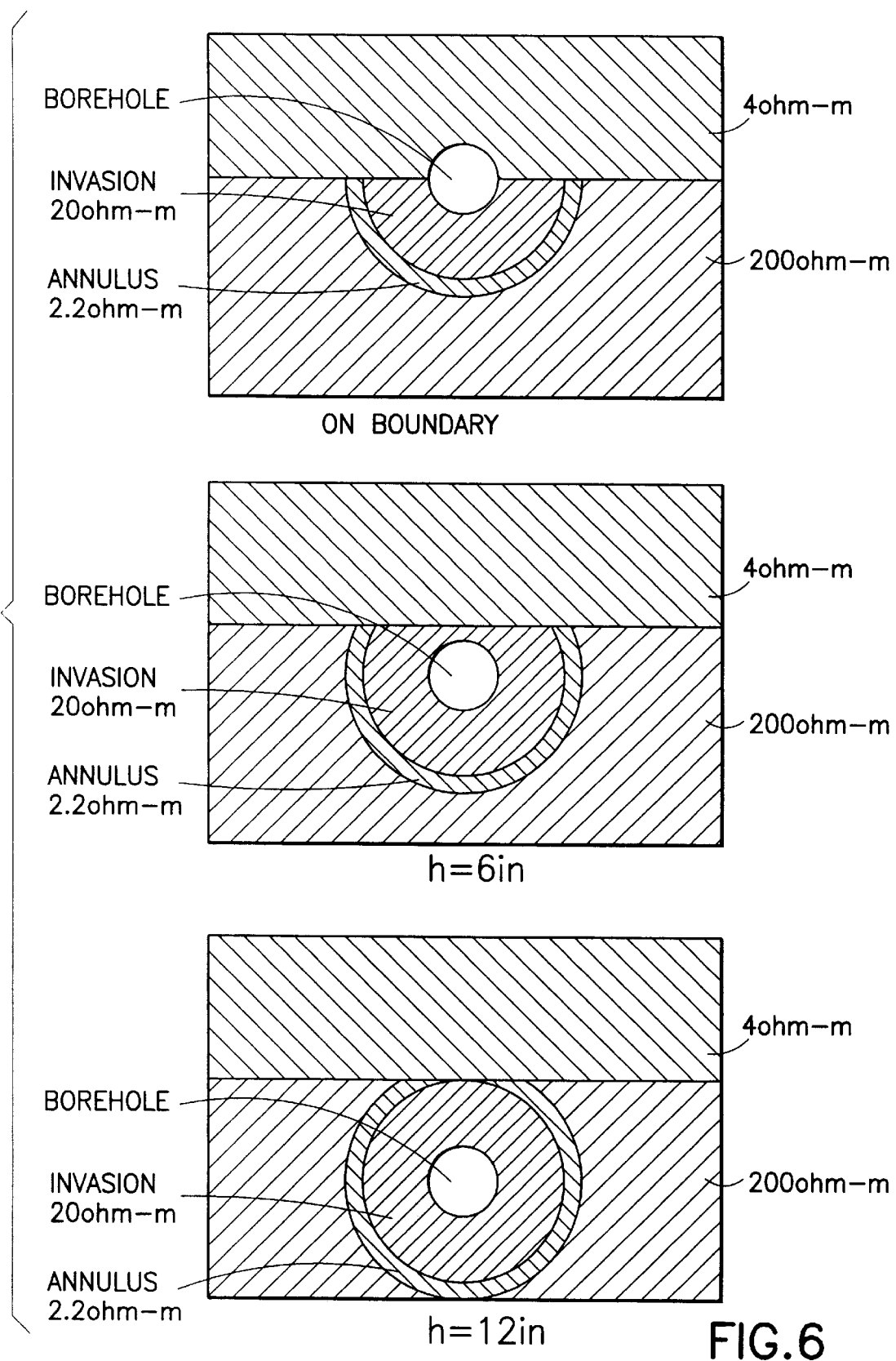
FIG. 6 depicts the assumed geometry used in modeling the field logs.

The zone from about 150 to 200 ft. was chosen for the modeling exercise. From the porosity logs, a knowledge of $R_\omega$ (0.05 ohm-m at this depth), and the tool response, a model was made of the annulus profile. It is reasonable to assume that the shallow AIT logs respond to the invasion profile, while the deeper logs respond more to the nearby boundaries. It was assumed that invasion begins as soon as the bit penetrates the sand, and that the depth of invasion varies only slightly. The effect of the shale was to cut off the upper part of the invasion. FIG. 6 shows the assumed behavior of the invasion, as the wellbore penetration into the sand. This reasoning was used to form the 3D model used to compute the logs shown in FIG. 7. Although the field log does not cross the shale interface, the model does so to show the AIT response across the boundary with the assumed invasion shape just below the interface. The invasion diameter was varied to fit in with the variations in porosity, and because of the large excursions of the 90-in log, required these changes.

Figure 7:
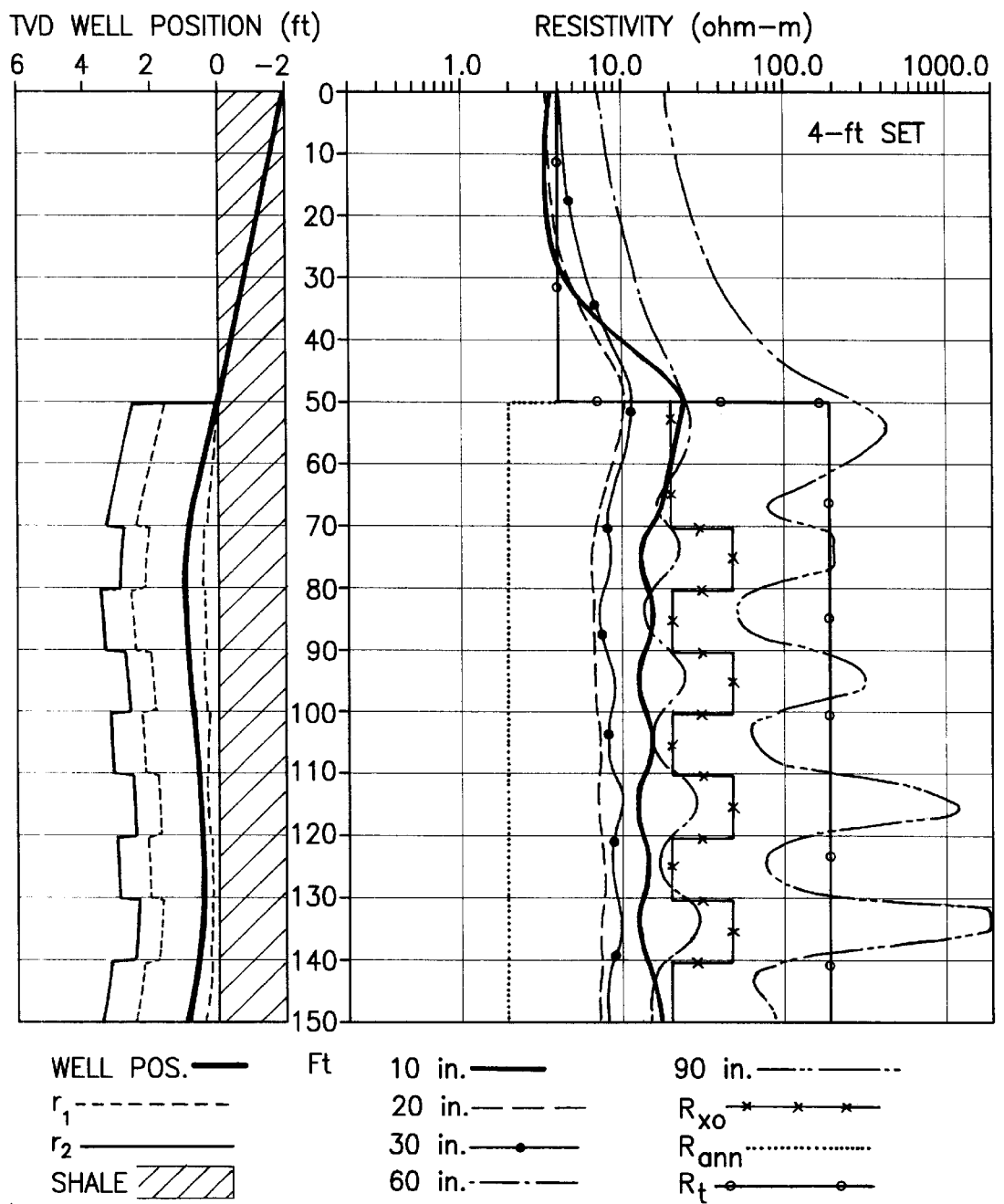
FIG. 7 shows simulation results for the well depicted in FIG. 6.

The computed logs in FIG. 7 are derived from several models, as shown in FIG. 6, with the intermediate points obtained by interpolation. The qualitative agreement between the field logs and the modeled logs suggests that the annulus profile is real. The behavior of all the logs is a complicated mixture of invasion and highly deviated bed boundary effects.

This example illustrates that, just as in vertical wells, it is inadequate to assume a simple invasion model in horizontal wells. Only modern multi-array tools and full 3D modeling and interpretation can provide an accurate evaluation of resistivity logs in horizontal wells.

Figure 8:
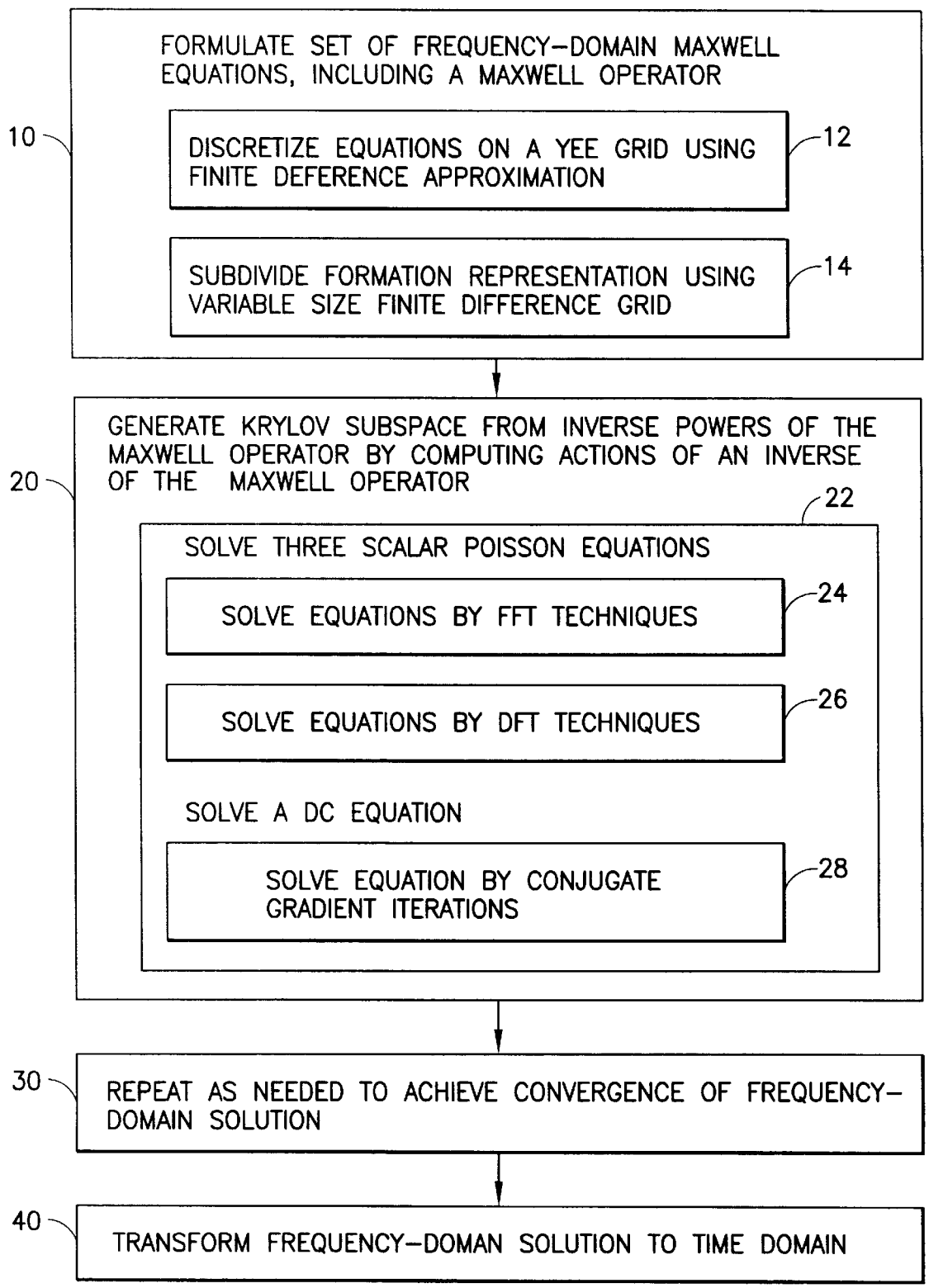
FIG. 8 presents embodiments of the present method, apparatus, and article of manufacture in flowchart format.

Embodiments of the present method, apparatus, and article of manufacture are presented in flowchart format in FIG. 8. In Formulate Maxwell Equations 10, a set of frequency-domain Maxwell equations, including a Maxwell operator, are formulated using a three-dimensional representation of the subsurface formation. These frequency-domain Maxwell equations may be discretized using finite difference approximation on a Yee grid in Discretize Equations 12. The three-dimensional representation of the subsurface formation may be subdivided using a variable size finite difference grid in Subdivide Formation 14. In Generate Krylov Subspace 20, a Krylov subspace is generated from inverse powers of the Maxwell operator by computing actions of an inverse of the Maxwell operator. Computing an action of an inverse of the Maxwell operator may comprise solving three scalar Poisson equations and solving a DC equation in Solve Poisson/DC Equations 22. The scalar Poisson equations may be solved using FFT techniques in Solve By FFT Techniques 24. The scalar Poisson equations may be solved using DFT techniques in Solve By DFT Techniques 26. The DC equation may be solved by conjugate gradient iterations in Solve By CGI 28. Generate Krylov Subspace 20 is repeated as needed to achieve convergence of a frequency-domain solution that characterizes the modeled response of the electromagnetic tool to the subsurface formation in Repeat As Needed 30. The frequency-domain solution may be transformed to the time domain in Transform Solution 40.

References

[1] Alumbaugh D., and Newman G., Time efficient 3-D electromagnetic modeling on massively parallel computers, in Proc. of Int.Symp. on three-dimensional electromagnetics, October 1995, Schlumberger-Doll Research, Ridgefield.

[2] Anderson, B., Barber, T., Druskin, V., Dussan, E., Lee, P., Knizhnerman, L., and Davydycheva, S., qThe response of multiarray induction tools in highly dipping formations with invasion and in arbitrary 3D geometry, SPWLA Annual Conf, New Orleans, La., June, 1996.

[3] Boyse, W., Lynch, D., Paulsen K., and Minerbo G., Nodal based finite element modeling of Maxwell s equations,IEEE Trans. Antennas Propagat., 40 (1992) No 6, pp. 642–651.

[4] Druskin, V., and Knizhnerman, L., A spectral semi-discrete method for the numerical solution of 3-D non-stationary problems in electrical prospecting, Izv. Acad. Sci. USSR, "Phys. Solid Earth," 1988, No. 8, 63–74 (Russian; translated into English).

[5] Druskin, V. and Knizhnerman, L., Spectral approach to solving three-dimensional Maxwell's diffusion equations in the time and frequency domains, Radio Science, Vol. 29, No. 4, pp. 937–953, 1994.

[6] Druskin V. and Knizhnerman L., Extended Krylov subspaces: Approximation of the matrix square root and related functions, to appear at SIAM J. Matrix Analysis.

[7] Madden, T. R., and Mackie, R. L., 1989, Three-dimentional magnetotelluric modeling and inversion: Proc. IEEE, 77 318–323.

[8] Smith T., Conservative modeling of 3-D electromagnetic fields: II Biconjugate gradient solution and accelerator, Gephysics, 61, 5, 1996

[9] Yee, K. S., Numerical solution of initial boundary value problems involving Maxwell's equations in isotropic media, IEEE Trans. Antennas Prop., AP-14, pp. 302–307, 1966.

What is claimed is:

1. A method for modeling the response of an electromagnetic tool to a subsurface formation comprising:
   (i) formulating a set of frequency-domain Maxwell equations, including a Maxwell operator, using a three-dimensional representation of the subsurface formation;
   (ii) generating a Krylov subspace from inverse powers of the Maxwell operator by computing actions of an inverse of the Maxwell operator; and
   (iii) repeating (ii) as needed to achieve convergence of a frequency-domain solution that characterizes the modeled response of the electromagnetic tool to the subsurface formation.

2. A method as defined in claim 1, wherein computing an action of an inverse of the Maxwell operator comprises:
   (a) solving three scalar Poisson equations; and
   (b) solving a DC equation.

3. A method as defined in claim 2, wherein the scalar Poisson equations are solved by FFT techniques.

4. A method as defined in claim 2, wherein the scalar Poisson equations are solved by DFT techniques.

5. A method as defined in claim 2, wherein the DC equation is solved by conjugate gradient iterations.

6. A method as defined in claim 1, further comprising:
   (iv) transforming the frequency-domain solution to the time domain.

7. A method as defined in claim 1, wherein the frequency-domain Maxwell equations are discretized using finite difference approximation on a Yee grid.

8. A method as defined in claim 1, wherein a variable size finite difference grid is used to subdivide the three-dimensional representation of the subsurface formation.

9. Apparatus for modeling the response of an electromagnetic tool to a subsurface formation comprising:
   (i) means for formulating a set of frequency-domain Maxwell equations, including a Maxwell operator, using a three-dimensional representation of the subsurface formation;
   (ii) means for generating a Krylov subspace from inverse powers of the Maxwell operator by computing actions of an inverse of the Maxwell operator; and
   (iii) means for repeating (ii) as needed to achieve convergence of a frequency-domain solution that characterizes the modeled response of the electromagnetic tool to the subsurface formation.

10. Apparatus as defined in claim 9, wherein computing an action of an inverse of the Maxwell operator comprises:
    (a) solving three scalar Poisson equations; and
    (b) solving a DC equation.

11. Apparatus as defined in claim 10, wherein the scalar Poisson equations are solved by FFT techniques.

12. Apparatus as defined in claim 10, wherein the scalar Poisson equations are solved by DFT techniques.

13. Apparatus as defined in claim 10, wherein the DC equation is solved by conjugate gradient iterations.

14. Apparatus as defined in claim 9, further comprising:
    (iv) means for transforming the frequency-domain solution to the time domain.

15. Apparatus as defined in claim 9, wherein the frequency-domain Maxwell equations are discretized using finite difference approximation on a Yee grid.

16. Apparatus as defined in claim 9, wherein a variable size finite difference grid is used to subdivide the three-dimensional representation of the subsurface formation.

17. An article of manufacture for use in connection with a computer, said article of manufacture comprising a computer-readable storage medium having a program embodied therein which causes said computer to:
    (i) formulate a set of frequency-domain Maxwell equations, including a Maxwell operator, using a three-dimensional representation of a subsurface formation;
    (ii) generate a Krylov subspace from inverse powers of the Maxwell operator by computing actions of an inverse of the Maxwell operator; and
    (iii) repeat (ii) as needed to achieve convergence of a frequency-domain solution that characterizes a modeled response of an electromagnetic tool to the subsurface formation.

18. An article of manufacture as defined in claim 17, wherein computing an action of an inverse of the Maxwell operator comprises:
    (a) solving three scalar Poisson equations; and
    (b) solving a DC equation.

19. An article of manufacture as defined in claim 18, wherein said program solves the DC equation by conjugate gradient iterations.

20. An article of manufacture as defined in claim 17, wherein said program further causes said computer to:
    (iv) transform the frequency-domain solution to the time domain.

* * * * *